United States Patent Office 3,286,335
Patented Nov. 22, 1966

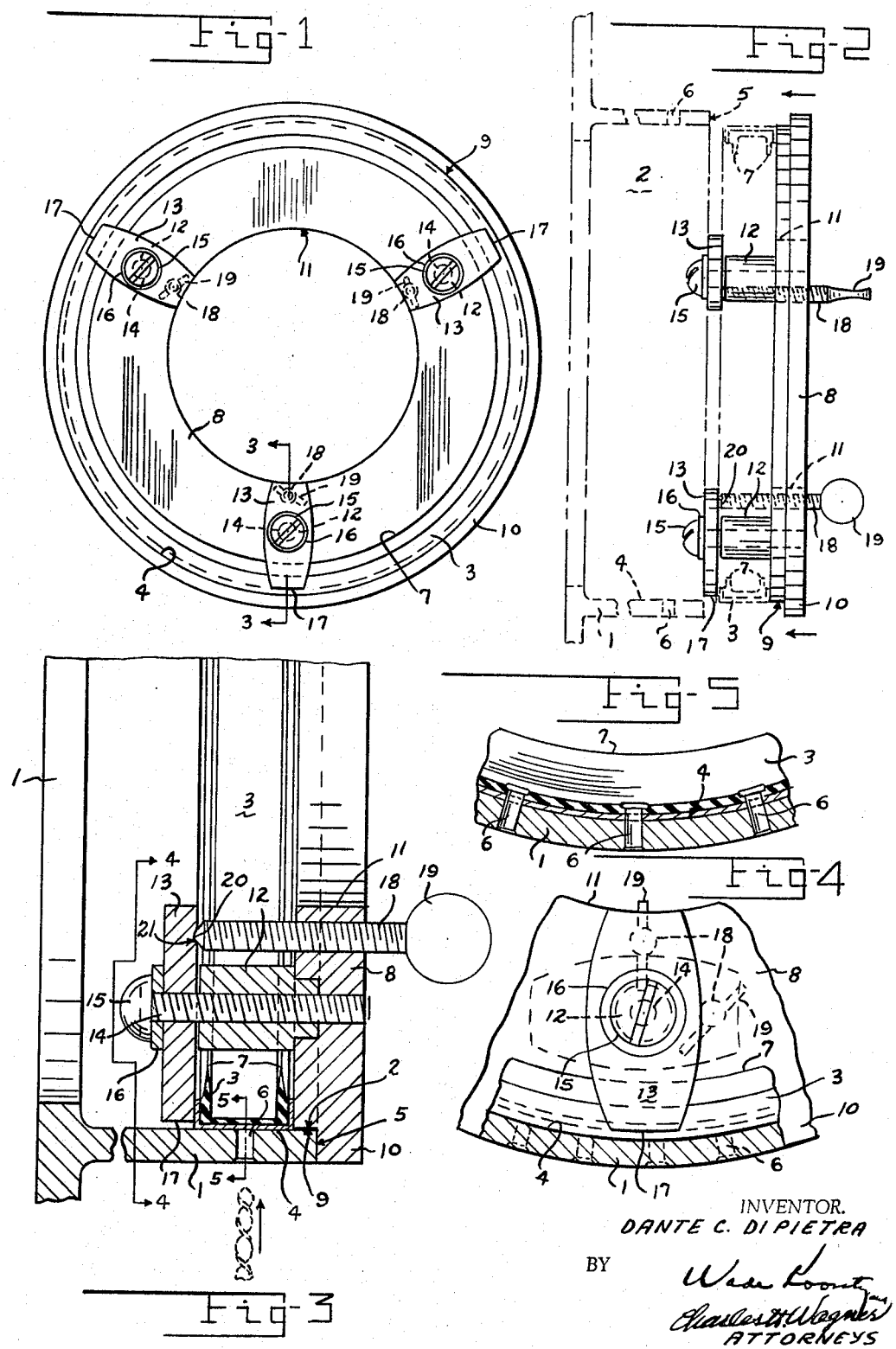

3,286,335
METHOD FOR REPLACING A SEAL
IN A SUPPORT HOUSING
Dante C. Di Pietra, 1108 Elwood St., Rome, N.Y.
Filed Mar. 23, 1964, Ser. No. 354,185
1 Claim. (Cl. 29—401)

The invention described herein may be manufactured and used by or for the United States Government for governmental purposes without payment to me of any royalty thereon.

This invention relates to an improved method for the accurate replacement of annular gas seals for turbojet engines and more particularly for the replacement of rear shaft gas seals on J–57 engines having, for an object, the handling of these annular gas seals to prevent injury or damage thereof during the replacement, and providing means for supporting and positioning of the seals in the engine whereby these annular seals may be accurately drilled for the securing rivets while seated and securely held in their required position in the engine by the fixture.

A further object is the provision of a method for placing in position a gas seal ring in the rear shaft bearing support housing of a gas turbine engine, particularly a J–57 engine, and maintaining it in position during the drilling step in the gas seal ring fastening procedure.

A further object is the provision of a simple, inexpensive, and time saving method for temporarily positively supporting an annular ring member for insertion and accurate positioning in a complemental ring receiving annular opening in a predetermined axial position in the opening during the ring fastening operation, in which a fixture is easily released and removed from the ring and the opening without danger of injury to the ring or to the surface of the opening.

A further object is the provision of a simple and handy method as indicated above, which may also be employed for removing a damaged ring or gas seal from its seat or opening in the engine, as well as easily, conveniently, and accurately employed for supporting and positioning a new or replacement ring or annular gas seal in its receiving opening or seat.

Other objects and advantages of the invention will become apparent from the following description and accompanying drawings in which like reference characters refer to like parts in the several figures.

FIGURE 1 is a plan view of the improved gas turbine rear shaft gas seal replacement device or fixture showing the inner side thereof with the clamp members in operative position, and an annular rear shaft gas seal member centered and clamped therein against the apertured plate of the fixture, ready for insertion and positioning in the turbine rear bearing support assembly.

FIGURE 2 is a side elevation of the fixture shown in FIGURE 1 with a new or replacement gas seal shown in dotted lines in position on the fixture, with the gas seal receiving structure or turbine rear bearing support shown in dot-and-dash lines but with the fixture in position for inserting the seal in position in its receiving opening of the support.

FIGURE 3 is an enlarged fragmentary radial sectional view, taken about on the plane indicated by line 3—3 in FIGURE 1, showing the fixture, with the gas seal ring seated in the housing or bearing support, ready for the drilling procedure, and depicting a drill for this purpose in dotted lines.

FIGURE 4 is a fragmentary elevation of the fixture, taken about on line 4—4 in FIGURE 3, with one of the retainer clamps for the gas seal shown in operative clamping position in full lines, and in release position in dotted lines, whereby the fixture can be removed, leaving the gas seal in its proper position in the housing, and;

FIGURE 5 is a fragmentary sectional view taken about on line 5—5 in FIGURE 3, showing the replacement seal after it has been drilled and riveted in position, and the fixture of the invention has been removed.

In the drawings the reference numeral 1 denotes a cylindrical bearing receiving and supporting structure having a circular opening 2 for receiving and supporting an annular or circular ring member 3, in this case the member 1 comprising the rear bearing support housing of a turbojet engine, more particularly a J–57 engine having an inner cylindrical wall surface 4 for receiving and supporting the ring member 3 which comprise the turbine rear bearing gas seal of a turbojet engine, more particularly a J–57 engine. This annular seal 3 is secured in position at a predetermined axial distance from the outer end 5 of the cylindrical seal receiving opening by a plurality of rivets 6 which must be removed by center punching the heads, drilling therethrough, and punching the rivets 6 out before the seal can be removed and replaced. This becomes necessary when the inside diameters or edges 7 of the turbine rear shaft gas seals 3 become burred, dented, scored, uneven, or damaged in any way so as not to make a perfect seal with the rear bearing shaft (not shown). These edges 7 are fairly sharp and can therefore be easily damage. Furthermore, the replacement seals are not drilled for the retaining rivets 6 and must be drilled while held in place to suit the rivet holes already in the housing 1. Normally this operation, including the insertion of the ring seal in precise axial position and holding the same in proper position so that the rivet holes, when drilled, will come midway between the spaced annular lips without injury to the delicate edges 7 in the process was a difficult, delicate, and time consuming operation. The improved seal supporting and positioning fixture of the invention reduces this seal replacement operation to a simple, easy, quick and accurate operation.

The fixture comprises a rigid circular plate or disk 8 having a circular periphery 9 of predetermined thickness adapted to fit into the inner diameter 2 of the rear bearing housing 1 with substantially little or no play, the disk 8 having an annular outer peripheral stop flange 10 for positioning engagement with the outer end 5 of the housing 1. The plate or disk 8 is formed with a large concentric access opening 11 therethrough for insertion of temporary bolt and nut fasteners through the rivet holes 6 in the housing 1 and holes which are inwardly drilled through the periphery of the seal 3 in alignment with the holes in the housing for the rivet 6 while the seal is being accurately held in place during the drilling procedure.

The inner face of the plate 8 carries a plurality of pivot posts 12, as best seen in FIGURES 2 and 3, on which are rotatably adjustably, and somewhat loosely pivoted the clamping or adjustable seal retaining finger members 13, being pivoted on threaded, headed members or stems 14 and retained by the heads 15, with suitable and preferably resilient washers 16 therebetween. The outer ends 17 of the retaining or clamping members 13, when in operative position as seen in FIGURES 3 and 4, lie in on a circle which has a radius less than the radius of the outer surface of the gas seal ring 3.

Spaced radially inward from each of the posts 12 and threadably extending through the plate 8 are threaded clamp screws 18 each having a manual manipulating handle or thumb piece 19, being in the nature of a thumb screw with the outer extremity 20 adapted to engage and tilt the pivoted clamp 13 (when in radial position) into clamping engagement with the side of the seal ring 3 and clamp the same in a plurality of points in concentric position against the inner face of the plate 8, flush with the circular portion 9 thereof.

If desired, the centrally pivoted clamping members on fingers 13 may be provided with slight depressions or "dwells" 21, as seen in FIGURE 3, to assist in holding the clamping fingers 13 in radial operative positions while the thumb screws 18 are being tightened to hold the seal ring 3 in position on the plate 8, and prevent the fingers from turning from their radial clamping positions until the thumb screws 18 are fully loosened.

In the method employed, assuming that a seal is to be replaced, the heads of the rivets 6 are center punched and drilled through, after which the rivets are punched out leaving the surface 4 with the rivet receiving holes therein. The old or damaged gas seal is now free for removal and this can be accomplished by axial outward withdrawal. If the sealing ring 3 cannot be withdrawn easily, the fixture may also be used for this purpose by inserting the reduced circular portion 9 into the bearing receiving support 1 until the flange 10 abuts the end or shoulder 5 and rotating pivoted fingers to engage over the side of the seal. The thumb screws may be tightened, after which the plate 8 is accessible for withdrawal, thus withdrawing the annular gas seal out of the housing 1.

When the old seal has been removed a new gas seal is placed concentrically on the fixture or plate 8 and the fingers 13 clamped down against the side of the seal 3 by tightening the thumb screws 18. This secures the gas seal ring in concentric substantially aligned relation with the periphery or pilot portion 9 of the plate. It should be observed that the distance from the shoulder between the flange 10 and the inner side of the plate 8 against which the seal is clamped is predetermined to equal the initial desired distance from the outer end 5 of the housing to the adjacent side of the annular gas seal ring 8 when in place, relative to the holes for the rivets 6.

Therefore, when the fixture, carrying the gas seal, is inserted and forced down to dispose the shoulder or flange 10 against the outer edge 5, the seal is securely, accurately, and positively held in its desired predetermined position or locating the central plane between the lips 7 coincident to the plane through the centers of the openings for the rivets 6.

With the gas sealing ring held in place by the "fixture" of the subject invention, a drill substantially the size of the rivet holes is inserted through the rivet holes and operated to drill through the base of the seal, for instance in four different (N. S. E. and W.) radial directions, after which bolts are inserted through these holes, and nuts applied and tightened. These may be inserted through the access opening 11. This operation positively holds the gas seal ring 3 in the desired predetermined location and the drill can now be operated to drill out the remainder of the rivet holes through the base of the seal. The fingers 13 can now be rotated to their inoperative positions (as seen in FIGURE 4 in dotted lines) and the fixture of the subject invention removed (after the four or more) initial holes are drilled, bolts inserted, and nuts threaded thereon and tightened.

In the next step, rivets are inserted from the inside and the heads pressed against the inside of the seal and the desired tool is employed to expand the tails to thereby clinch the rivets 6 in place to secure the gas seal firmly and permanently in position. The four temporary bolts can now be removed and the remaining rivets inserted and clinched.

For purposes of exemplification, a particular embodiment of the invention has been shown and described to the best understanding thereof. However, it will be apparent that minor changes and modifications in the arrangement and construction of the parts thereof may be resorted to without departure from the true spirit and scope of the invention as defined in the accompanying claim.

I claim:

A method for replacing circular rear shaft bearing gas seals in rear shaft bearing support housings in gas turbine engines having said seals riveted radially through the bases thereof and said housings in axially spaced relation to the outer ends of the housings which comprises, drilling the rivets radially from the center of the housing to remove the rivet heads, driving the rivets out of the seal and the housing from the inside of the seal to free seal in said housing, withdrawing said seal axially out of said housing through said outer end, inserting an undrilled similar replacement seal in said outer end of said housing perpendicular to the axis of the housing, moving said seal a predetermined distance into said housing while securely retaining said seal in said perpendicular relation to the axis of said housing to locate and support said replacement seal in said housing an axial distance from the outer end of the housing a distance equal to the distance from the outer end of the housing equal to the distance from said end to a transverse plane through the centers of the rivet holes for the rivets for securing the seal in the housing less one-half the distance between the opposite side faces of the seal to dispose a median plane through the base of the seal coincident with a plane through the centers of the rivet holes aforesaid in the housing, drilling radially inward through the rivet holes in the housing to form at least three rivet holes through the base of the seal in three appreciably circumferentially spaced radial directions to form rivet receiving holes through the center of the base of the seal aligned with the rivet holes in the housing, inserting bolt means through said holes and tightening the same to securely fix said seal in said housing, drilling the remainder of the rivet holes in the seal through the rivet holes in the housing while said seal is supported in position in said housing by said bolt means, inserting final rivets for the seal through the drilled holes, from the inside and spreading the outer ends to clinch the same and securely fix said seal in said housing, removing said bolt means and inserting the remaining rivets in place thereof, spreading the outer ends thereof to clinch the same and secure the replacement in the housing with the rivets therefor passing outwardly through the base of the seal midway between the front and faces thereof.

References Cited by the Examiner

UNITED STATES PATENTS

| 2,641,379 | 6/1953 | Barbara | 29—401 |
| 2,712,248 | 7/1955 | Gustafson | 77—63 |
| 3,096,573 | 7/1963 | Connors et al. | 29—401 X |

JOHN F. CAMPBELL, *Primary Examiner.*

THOMAS H. EAGER, *Examiner.*